United States Patent
Millmore et al.

(10) Patent No.: US 10,255,562 B2
(45) Date of Patent: Apr. 9, 2019

(54) SYNDICATING ENTERPRISE APPLICATION SYSTEM DATA

(75) Inventors: Martin Millmore, Reading (GB); Dinesh Arora, Cupertino, CA (US); Michael Rossi, Manhattan Beach, CA (US); Aaron Green, San Francisco, CA (US); Paul Brimble, Yelverton (GB)

(73) Assignee: Oracle International Corporation, Redwood Shores, CA (US)

( * ) Notice: Subject to any disclaimer, the term of this patent is extended or adjusted under 35 U.S.C. 154(b) by 1428 days.

(21) Appl. No.: 12/129,054

(22) Filed: May 29, 2008

(65) Prior Publication Data

US 2009/0300098 A1    Dec. 3, 2009

(51) Int. Cl.
*G06Q 10/06* (2012.01)
*G06F 17/24* (2006.01)
*G06F 17/30* (2006.01)
*G06F 17/22* (2006.01)

(52) U.S. Cl.
CPC ......... *G06Q 10/06* (2013.01); *G06F 17/2247* (2013.01); *G06F 17/24* (2013.01); *G06F 17/3089* (2013.01)

(58) Field of Classification Search
CPC .. G06F 17/2247; G06F 17/24; G06F 17/3089; G06Q 10/06
USPC .......... 715/205, 208, 234, 200, 201
See application file for complete search history.

(56) References Cited

U.S. PATENT DOCUMENTS

| | | | |
|---|---|---|---|
| 5,884,035 A * | 3/1999 | Butman | G06F 17/3089 707/999.01 |
| 7,148,977 B2 * | 12/2006 | Zerza et al. | 358/1.14 |
| 7,197,741 B1 | 3/2007 | Stapf | |
| 7,640,184 B1 * | 12/2009 | Lunt | 709/217 |
| 8,073,830 B2 * | 12/2011 | Fontes | G06F 17/30864 707/706 |
| 2001/0047276 A1 * | 11/2001 | Eisenhart | G06Q 10/10 705/37 |
| 2002/0087509 A1 * | 7/2002 | Meirsonne | G06F 17/3089 |
| 2002/0087690 A1 * | 7/2002 | Hepper | G06Q 10/10 709/225 |
| 2002/0194329 A1 * | 12/2002 | Alling | 709/224 |
| 2004/0119738 A1 * | 6/2004 | Beringer et al. | 345/738 |
| 2004/0122853 A1 * | 6/2004 | Moore | 707/103 R |
| 2004/0133413 A1 * | 7/2004 | Beringer et al. | 703/22 |
| 2004/0230447 A1 * | 11/2004 | Schwerin-Wenzel et al. | 705/1 |
| 2005/0187862 A1 * | 8/2005 | Dheer | G06F 17/30899 705/39 |
| 2005/0267973 A1 * | 12/2005 | Carlson et al. | 709/228 |
| 2006/0073812 A1 * | 4/2006 | Punaganti Venkata | H04L 67/26 455/412.1 |
| 2006/0128364 A1 * | 6/2006 | Costa-Requena et al. | 455/414.3 |

(Continued)

*Primary Examiner* — Thu V Huynh
(74) *Attorney, Agent, or Firm* — Potomac Law Group, PLLC (57) ABSTRACT

Systems and methods are provided that syndicate enterprise application system (EAS) data. A method includes creating a feed for an EAS module, generating a news item for the feed, and publishing the news item on the feed. Accordingly, employees in an organization are able to easily become aware of information about their organization by tightly coupling a syndication system to human resources management. The sharing of information throughout the organization creates a more inclusive and cohesive working environment. In one embodiment, the EAS data is enterprise resource planning (ERP) data.

20 Claims, 4 Drawing Sheets

(56) References Cited

U.S. PATENT DOCUMENTS

| | | |
|---|---|---|
| 2006/0173985 A1 | 8/2006 | Moore |
| 2006/0184617 A1* | 8/2006 | Nicholas et al. ............. 709/203 |
| 2007/0050175 A1* | 3/2007 | Schmelzer et al. .......... 702/186 |
| 2007/0061393 A1* | 3/2007 | Moore .......................... 709/201 |
| 2007/0067725 A1 | 3/2007 | Cahill et al. |
| 2007/0094365 A1* | 4/2007 | Nussey ............. G06F 17/30867 709/223 |
| 2007/0094390 A1* | 4/2007 | Nussey ......................... 709/225 |
| 2007/0124430 A1* | 5/2007 | Wright et al. ................. 709/219 |
| 2007/0156809 A1 | 7/2007 | Dickinson et al. |
| 2007/0198943 A1* | 8/2007 | Grason .................. G06Q 30/06 715/776 |
| 2007/0208751 A1* | 9/2007 | Cowan .................... G06Q 30/02 |
| 2007/0220016 A1* | 9/2007 | Estrada ............. G06F 17/30867 |
| 2007/0226369 A1* | 9/2007 | Laing ................. G06F 17/3089 709/246 |
| 2008/0046437 A1* | 2/2008 | Wood .............................. 707/10 |
| 2008/0046471 A1* | 2/2008 | Moore ................ G06Q 10/109 |
| 2008/0086484 A1* | 4/2008 | Darnell ............... G06F 17/3089 |
| 2008/0091796 A1* | 4/2008 | Story et al. ................... 709/217 |
| 2008/0147729 A1* | 6/2008 | Trevor et al. .............. 707/104.1 |
| 2008/0244091 A1* | 10/2008 | Moore et al. ................. 709/246 |
| 2008/0288494 A1* | 11/2008 | Brogger ................. G06Q 30/02 |
| 2008/0288640 A1* | 11/2008 | Trevor et al. ................. 709/226 |
| 2008/0301045 A1* | 12/2008 | Lappin .................. G06Q 20/10 705/39 |
| 2009/0063643 A1* | 3/2009 | Setiawan et al. ............. 709/206 |
| 2009/0112986 A1* | 4/2009 | Caceres .............. G06Q 10/109 709/204 |

\* cited by examiner

SYNDICATING ENTERPRISE APPLICATION SYSTEM DATA

FIELD OF THE INVENTION

One embodiment is directed generally to Enterprise Application Systems ("EASs"), and in particular to the syndication of EAS data.

BACKGROUND INFORMATION

Enterprise Application Systems are typically integrated software applications that perform business functions such as accounting, production scheduling, customer information management, human capital management, etc. They are frequently implemented on servers and simultaneously provide services to a large number of users, typically over a computer network. These systems are in contrast to the more common single-user software applications which run on a user's own local computer and serve only one user at a time. Typically, the Enterprise Application System ("EAS") is implemented as a group of software modules sharing a common database. Examples of an EAS include a Customer Relations Management ("CRM") system, a Manufacturing Resource Planning ("MRP") system, and an Enterprise Resource Planning ("ERP") system.

Enterprise Resource Planning is an industry term for integrated, multi-module application software packages that are designed to serve and support multiple business functions. An ERP system can include software for manufacturing, order entry, accounts receivable and payable, general ledger, purchasing, warehousing, transportation and human resources. Evolving out of the manufacturing industry, ERP implies the use of packaged software rather than proprietary software written by or for one customer. ERP modules may be able to interface with an organization's own software with varying degrees of effort, and, depending on the software, ERP modules may be alterable via the vendor's proprietary tools as well as proprietary or standard programming languages.

One module that enjoys widespread use is the human resources module. A human resources module in an ERP system typically contains information that would be useful to employees regarding their work environment. For example, the human resources module might have data regarding new promotions or performance evaluations of coworkers. Presently, there is not an easy or efficient way for employees to access that information, or even become aware of its existence.

SUMMARY OF THE INVENTION

One embodiment is a method for syndicating enterprise application system (EAS) data. The method comprises creating a feed for an EAS module; generating a news item for the feed; and publishing the news item on the feed.

DETAILED DESCRIPTION

Figure 1:
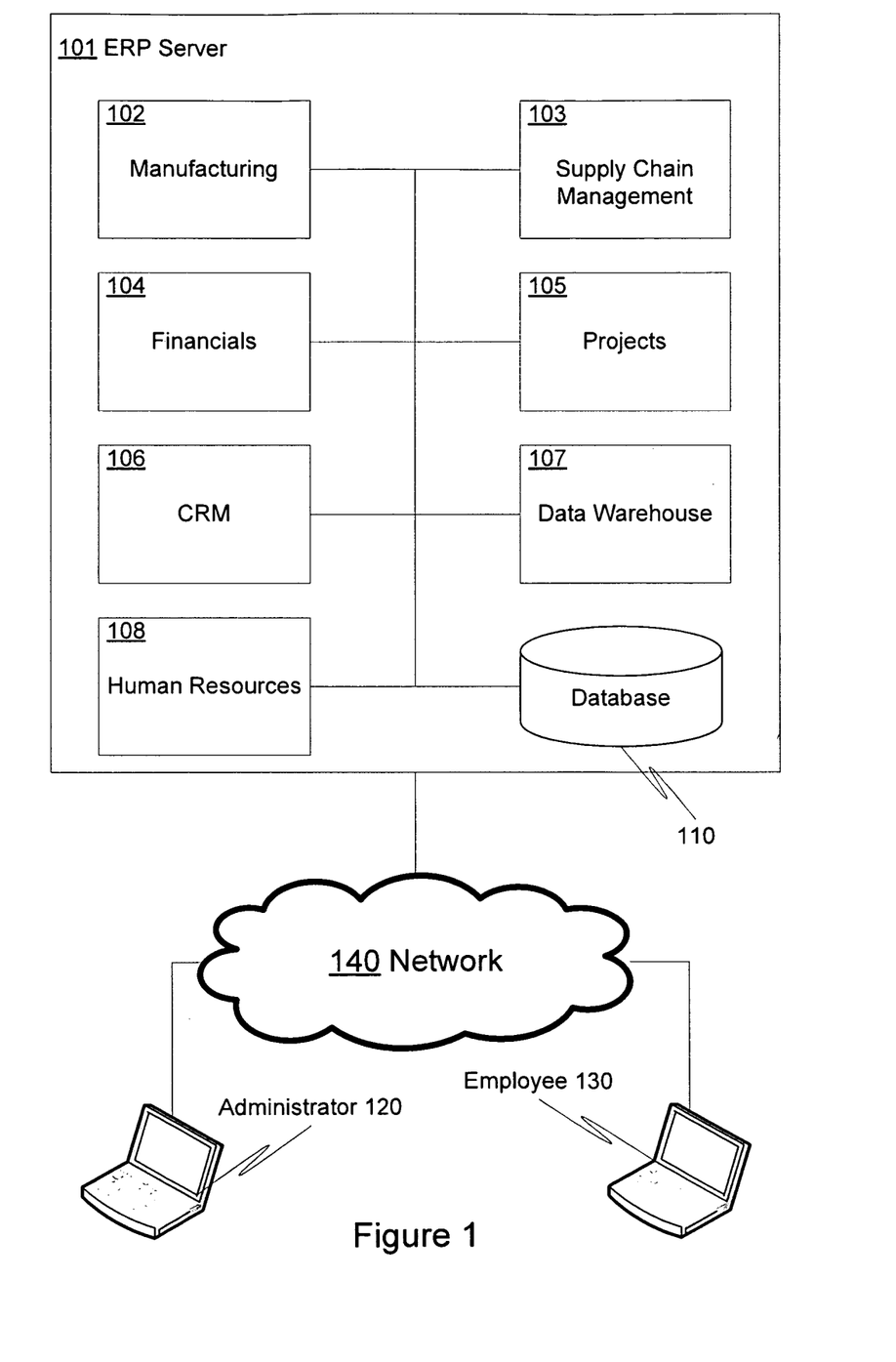
FIG. 1 is a block diagram of an ERP system in accordance with an embodiment.

An embodiment is a method for syndicating EAS data. In one embodiment, the EAS data and contact information are stored on an ERP server. FIG. 1 is a block diagram of an ERP server 100 in accordance with this embodiment. ERP is a software architecture that facilitates the flow of information among the different functions within an enterprise. Similarly, ERP facilitates information sharing across organizational units and geographical locations. It enables decision-makers to have an enterprise-wide view of the information they need in a timely, reliable and consistent fashion. ERP provides the backbone for an enterprise-wide information system. At the core of this enterprise software is a central database that draws data from and feeds data into modular applications that operate on a common computing platform, thus standardizing business processes and data definitions into a unified environment. With an ERP system, data needs to be entered only once. The system provides consistency and visibility or transparency across the entire enterprise. A primary benefit of ERP is easier access to reliable, integrated information. A related benefit is the elimination of redundant data and the rationalization of processes, which result in substantial cost savings.

In one embodiment, ERP server 100 is implemented as part of the Oracle® E-Business Suite. ERP server 100 includes a processor (not shown) for executing instructions and a memory (not shown) for storing an operating system and software modules executable by the processor. ERP server 100 is accessible by at least one administrator 120 and at least one employee 130 via, for example, network 140. ERP server 100 includes a plurality of modules 102-108 and a central database 110 including data collected, utilized and reported by modules 102-108. Manufacturing module 102 collects, utilizes and reports data relating to manufacturing engineering, bills of material, scheduling, capacity, workflow management, quality control, cost management, manufacturing process, manufacturing projects, and manufacturing flow, among other aspects. Supply Chain Management module 103 collects, utilizes and reports data relating to inventory, order entry, purchasing, supply chain planning, supplier scheduling, inspection of goods, claim processing, and commission calculation, among other aspects. Financials module 104 collects, utilizes and reports data relating to general ledgers, cash management, accounts payable, accounts receivable, and assets, among other aspects. Projects module 105 collects, utilizes and reports data relating to costing, billing, and time and expenses of projects, employee activity on a project, among other aspects. Customer Relationships Management module 106 collects, utilizes and reports data relating to sales and marketing, commissions, service, customer contact, and call center support, among other aspects. Data Warehouse module 107 includes interfaces for suppliers, customers, and employees to access a data warehouse. Human Resources module 108 collects, utilizes and reports data relating to position management, performance review, applicant tracking, payroll, training, time and attendance, and benefits, among other aspects. Human Resources module 108 is described in greater detail below.

Figure 2:
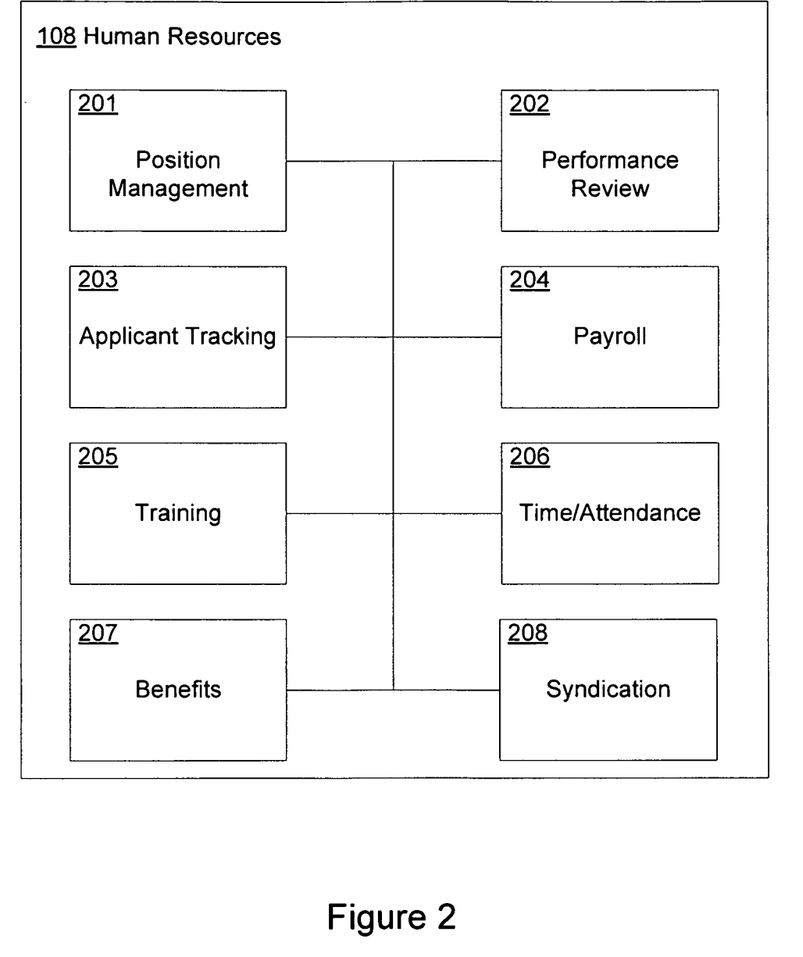
FIG. 2 is a block diagram of a human resources module in accordance with an embodiment.

FIG. 2 is a block diagram of Human Resources module 108 in accordance with an embodiment. Human Resources module 108 includes a plurality of modules 201-207 that collect, utilize and report data relating to human resources.

Position Management module 201 collects, utilizes and reports data relating to positions held by employees within the organization, and any change in those positions, among other aspects. Performance Review module 202 collects, utilizes and reports data relating to performance evaluations of employees within an organization, for example, as the evaluations relate to promotion or compensation, among other aspects. Applicant Tracking module 203 collects, utilizes and reports data relating to potential candidates for employment within the organization, among other aspects. Payroll module 204 collects, utilizes and reports data relating to employ compensation within the organization, among other aspects. Training module 205 collects, utilizes and reports data relating to continuing education courses available to employees, and which employees have completed such courses, among other aspects. Time and Attendance module 206 collects, utilizes and reports data relating to hours worked, days present, sick leave, and vacation leave for employees within the organization, among other aspects. Benefits module 207 collects, utilizes and reports data relating to employee benefits, for example, health and dental insurance, transit benefits, pension and retirement programs, and profit sharing programs, among other aspects.

Human Resources module 108 further includes a Syndication module 208 for syndicating human resource data via a web feed. A web feed is a document (often XML-based) which contains content items with web links to longer versions. News websites and blogs are common sources for web feeds, but feeds are also used to deliver structured information. "Publishing a feed" and "syndication" are two of the more common terms used to describe making available a feed for an information source, such as a server or a blog. Like syndicated print newspaper features or broadcast programs, web feed contents may be shared and republished. More often, feeds are subscribed to directly by users with aggregators or feed readers, which combine the contents of multiple web feeds for display on a single screen or series of screens. Some modern web browsers incorporate aggregator features. Depending on the aggregator, users typically subscribe to a feed by manually entering the URL of a feed or clicking a link in a web browser. Often the feed includes only a summary of the updated content, rather than the content itself.

Like web feeds for blogs or newspapers, a human resources feed publishes information about employees in the organization. For example, Syndication module 208 might publish information about an employee being promoted, completing a training course, or receiving a positive performance review. Employee blog entries may also be syndicated. In one embodiment, Syndication module 208 syndicates human resource data using Really Simple Syndication (RSS). RSS is an extensible Markup Language (XML)-based format that allows the syndication of lists of hyperlinks, along with other information, or metadata, that helps users decide whether they want to follow the link. Alternatively, other syndication formats, such as Atom, may be used. This allows employees' computers to fetch and understand the information, so that all of the lists they are interested in can be tracked and personalized for them. Syndication module 208 makes a feed, or channel, available, just like any other file or resource on the server. Once a feed is available, employees may subscribe to the feeds and their computers will regularly fetch the file to get the most recent items on the list, for example, with an aggregator.

A feed contains a list of items or entries, each of which is identified by a link. Each item can have any amount of other metadata associated with it as well. The most basic metadata for an entry includes a title for the link and a description of it. When syndicating news headlines, these fields might be used for the story title and the first paragraph or a summary. For example, a simple entry might look like:

```
<item>
    <title>Bob Smith Promoted</title>
    <link>http://intranet/hr/promotions</link>
    <description>Bob Smith was promoted to Regional Manager
    in charge of sales. Bob has been with the company for 10
    years.</description>
</item>
```

Administrator 120 may determine what data is syndicated and what feeds are published. In one embodiment, the administrator 120 customizes the ERP server 100 configuration to abstain from publishing confidential data. Employee 130 may determine which feeds to which they wish to subscribe. In one embodiment, employee 130 may subscribe to information regarding specific departments or personnel.

Figure 3:
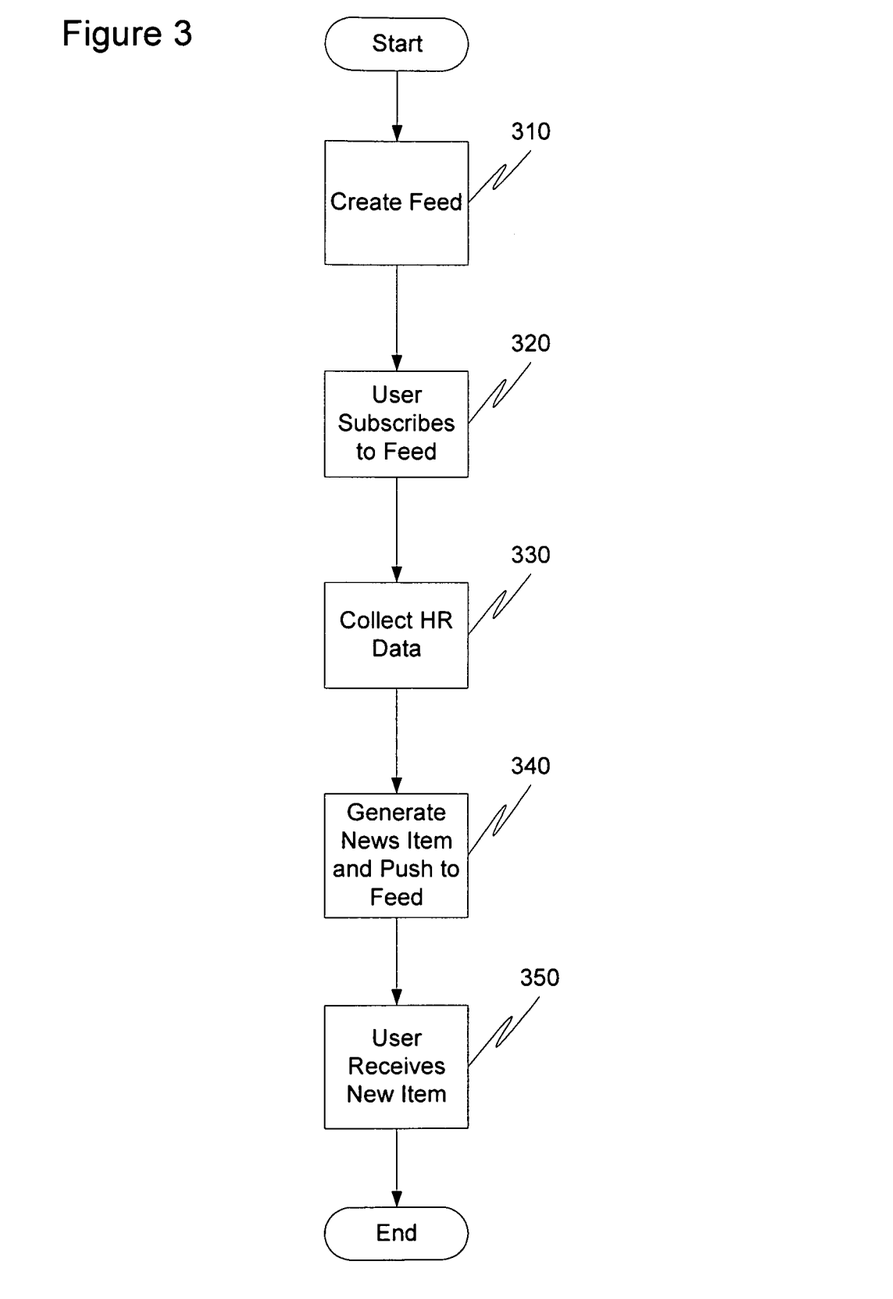
FIG. 3 is a flow chart illustrating a method for syndicating ERP data.
Figure 4:
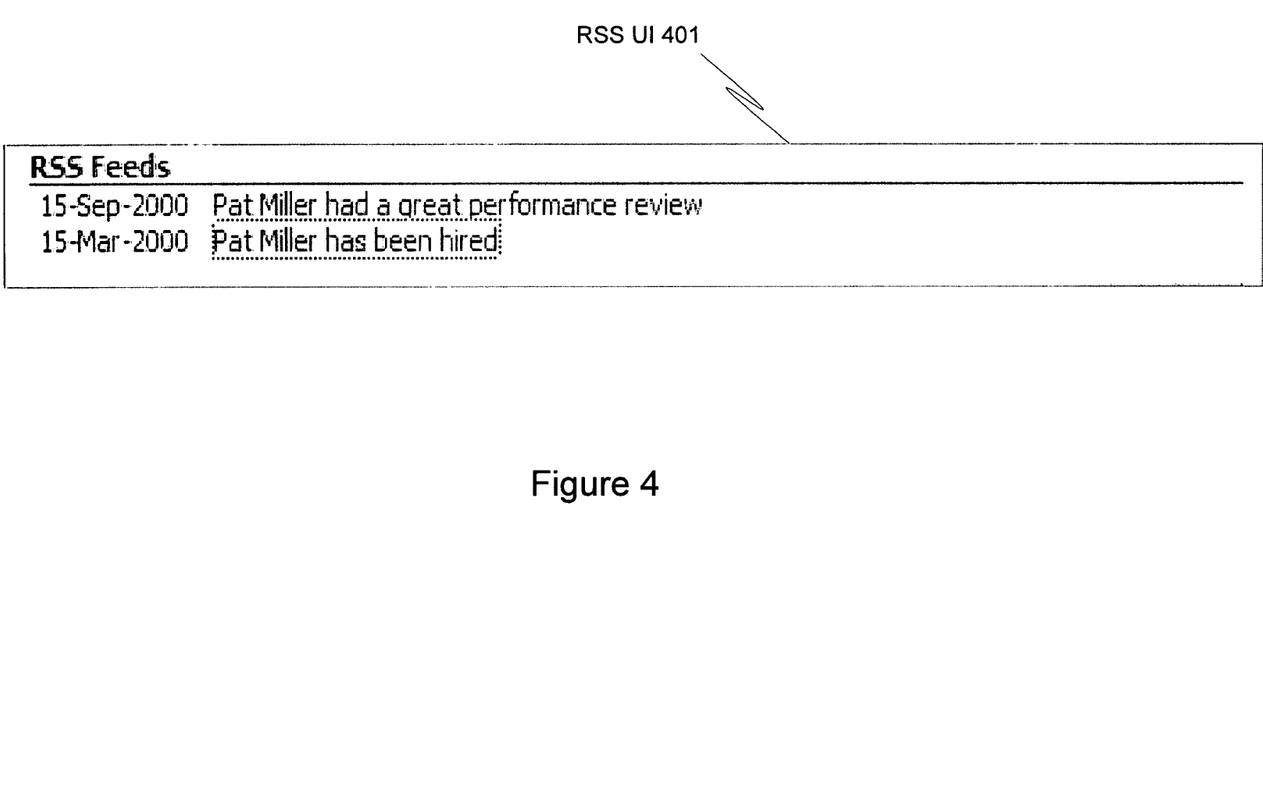
FIG. 4 illustrates an example RSS user interface (UI) 401 depicting RSS feeds of human resources data.

FIG. 3 illustrates a flow diagram of the functionality of ERP server 100 in accordance with an embodiment when syndicating ERP data. In one embodiment, the functionality of the flow diagram of FIG. 3 is implemented by software stored in memory and executed by a processor. In other embodiments, the functionality can be performed by hardware, or any combination of hardware and software. Syndication module 208 creates a feed for human resources data (310). For example, the Position Management module 201 passes data regarding employee positions to Syndication module 208, which then creates a feed for the Position Management data. A link to the feed is made available to employees in the organization. Employee 130 may desire updates from the Positions Management module 201, and thus accesses the feed by following the link or by subscribing to the feed by entering the link into the employee's RSS aggregator (320). When, for example, Position Management module 201 has data to report, it automatically sends it to the Syndication module 208 (330). Syndication module 208 then automatically generates an item for the data and pushes the item onto the feed (340). Employee 130 receives the data either by accessing a link to the data provided to the employee 130, or via the employee's RSS aggregator (350). The employee's aggregator can combine feeds from the Human Resources module with feeds from other modules 102-107, blogs, web sites, and organizational intranet sites. FIG. 4 illustrates an example RSS user interface (UI) 401 depicting RSS feeds of human resources data.

Accordingly, employees in an organization are able to easily become aware of information about their organization by tightly coupling a syndication system to human resources management. The sharing of information throughout the organization creates a more inclusive and cohesive working environment.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for syndicating enterprise application system (EAS) data implemented by a syndication module stored in a memory and executed by a processor, the method comprising:
   receiving, from an administrator computer, a configuration command to abstain from publishing confidential EAS data for a first EAS module, the first EAS module is part of an EAS system of an organization, wherein the EAS system comprises a plurality of EAS modules and EAS data for the plurality of EAS modules is stored in a central database for the EAS system;
   creating a feed for the first EAS module;
   receiving, from a computer of a first employee of the organization, a subscription request for the feed filtered according to a filter, wherein the filter comprises data from the first EAS module about a second employee of the organization;
   collecting EAS data automatically sent from the first EAS module, the EAS data comprising confidential and non-confidential data from the first EAS module about the second employee, wherein the EAS data is stored in the central database;
   automatically generating a news item about the second employee that includes only non-confidential EAS data collected from the first EAS module based on the configuration command to abstain from publishing confidential EAS data, wherein confidential data about the second employee of the organization is not included in the automatically generated news items; and
   publishing the news item about the second employee on the feed for the first EAS module, for access by the first employee according to the filter, by providing a link to the news item to the computer of the first employee, the news item including content, metadata having a first field for a title for the news item and a second field for content of the news item.

2. The method of claim 1, wherein publishing includes syndicating using Really Simple Syndication (RSS).

3. The method of claim 1, wherein the first EAS module is a human resources module.

4. The method of claim 3, wherein generating news item for the feed includes collecting data from the human resources module.

5. The method of claim 1, wherein creating the feed for an EAS module includes creating a feed for one of a position management module, a performance review module, an applicant tracking module, a payroll module, a training module, a time and attendance module, and a benefits module.

6. The method of claim 1, wherein generating the news item for the feed includes collecting data from one of a position management module, a performance review module, an applicant tracking module, a payroll module, a training module, a time and attendance module, and a benefits module.

7. The method of claim 1, wherein the EAS data is enterprise resource planning (ERP) data and the EAS module is an ERP module.

8. The method of claim 1, wherein the link comprises a uniform resource locator (URL) that includes an identifier of the first EAS module.

9. The method of claim 8, wherein the URL comprises an hypertext transfer control (HTTP) web address to an organizational intranet website.

10. The method of claim 1, wherein the non-confidential data included in the automatically generated news item comprises news about one or more of the second employee being promoted, the second employee completing a training course, or the second employee receiving a positive performance review.

11. The method of claim 10, wherein the feed for the first EAS module provides access to a subset of data about employees of the organization stored in the central database, wherein the subset of data does not include confidential data about the employees of the organization.

12. A non-transitory computer-readable medium having instructions stored thereon that, when executed by a processor, cause the processor to syndicate enterprise application system (EAS) data, the syndicating comprising:
   receiving, from an administrator computer, a configuration command to abstain from publishing confidential EAS data for a first EAS module, the first EAS module is part of an EAS system of an organization, wherein the EAS system comprises a plurality of EAS modules and EAS data for the plurality of EAS modules is stored in a central database for the EAS system;
   creating a feed for the first EAS module;
   receiving, from a computer of a first employee of the organization, a subscription request for the feed filtered according to a filter, wherein the filter comprises data from the first EAS module about a second employee of the organization;
   collecting EAS data automatically sent from the first EAS module, the EAS data comprising confidential and non-confidential data from the first EAS module about the second employee, wherein the EAS data is stored in the central database;
   automatically generating a news item about the second employee that includes only non-confidential EAS data collected from the first EAS module based on the configuration command to abstain from publishing confidential EAS data, wherein confidential data about the second employee of the organization is not included in the automatically generated news items; and
   publishing the news item about the second employee on the feed for the first EAS module, for access by the first employee according to the filter, by providing a link to the news item to the computer of the first employee, the news item including content, metadata having a first field for a title for the news item and a second field for the content of the news item.

13. The non-transitory computer-readable medium of claim 12, wherein the first EAS module is a human resources module.

14. The non-transitory computer-readable medium of claim 13, wherein generating the news item for the feed includes collecting data from the human resources module.

15. The non-transitory computer-readable medium of claim 13, wherein the EAS data is enterprise resource planning (ERP) data and the EAS module is an ERP module.

16. A system for syndicating human resource data, comprising:
   an administrator computer;
   a plurality of EAS modules that are part of an EAS system for an organization;
   a central database;
   a computer of a first employee of an organization; and
   a server, including a processor for executing instructions and a memory for storing software modules executable by the processor, the processor being configured to:
      receive, from the administrator computer, a configuration command to abstain from publishing confidential EAS data for a first EAS module from among the plurality of EAS modules, wherein EAS data for the plurality of EAS modules is stored in a central database for the EAS system, create a feed for the first EAS module, receive, from the computer of the first employee, a subscription request for the feed filtered according to a filter, wherein the filter comprises data from the first EAS module about a second employee of the organization, collect EAS data automatically sent from the first EAS module, the EAS data comprising confidential and non-confidential data from the first EAS module about the second employee, wherein the EAS data is stored in the central database, automatically generate a news item about the second employee that includes only non-confidential EAS data collected from the first EAS module based on the configuration command to abstain from publishing confidential EAS data, wherein confidential data about the second employee of the organization is not included in the automatically generated news items, and publish the news item about the second employee on the feed for the first EAS module, for access by the first employee according to the filter, by providing a link to the news item to the computer of the first employee, the news item including content, metadata having a first field for a title for the news item and a second field for the content of the news item.

17. The system of claim 16, wherein the feed is for one of a position management module, a performance review module, an applicant tracking module, a payroll module, a training module, a time and attendance module, and a benefits module within the human resource module.

18. A system for syndicating enterprise application system (EAS) data, comprising:

a processor for executing instructions; and a memory for storing a syndication module executable by the processor, the syndication module comprising:

means for receiving, from an administrator computer, a configuration command to abstain from publishing confidential EAS data for a first EAS module from among the plurality of EAS modules, wherein the syndication module is a component of the first EAS module and EAS data for the plurality of EAS modules is stored in a central database for the EAS system;

means for creating a feed for the first EAS module;

means for receiving, from an computer of a first employee, a subscription request for the feed filtered according to a filter, wherein the filter comprises data from the first EAS module about a second employee of the organization;

means for collecting EAS data automatically sent from the first EAS module, the EAS data comprising confidential and non-confidential data from the first EAS module about the second employee, wherein the EAS data is stored in the central database;

means for automatically generating a news item about the second employee that includes only non-confidential EAS data collected from the first EAS module based on the configuration command to abstain from publishing confidential EAS data, wherein confidential data about the second employee of the organization is not included in the automatically generated news items; and means for publishing the news item about the second employee on the feed for the first EAS module, for access by the first employee according to the filter, by providing a link to the news item to the computer of the first employee, the news item including content, metadata having a first field for a title for the news item and a second field for the content of the news item.

19. The system of claim 18, wherein the first EAS module is one of a position management module, a performance review module, an applicant tracking module, a payroll module, a training module, a time and attendance module, and a benefits module.

20. The system of claim 18, wherein the EAS data is enterprise resource planning (ERP) data and the EAS module is an ERP module.

* * * * *

UNITED STATES PATENT AND TRADEMARK OFFICE
CERTIFICATE OF CORRECTION

PATENT NO. : 10,255,562 B2  
APPLICATION NO. : 12/129054  
DATED : April 9, 2019  
INVENTOR(S) : Millmore et al.

Page 1 of 1

It is certified that error appears in the above-identified patent and that said Letters Patent is hereby corrected as shown below:

In the Specification

In Column 4, Line 50, delete "(Ul)" and insert -- (UI) --, therefor.

Signed and Sealed this  
Third Day of November, 2020

Andrei Iancu  
*Director of the United States Patent and Trademark Office*